US006799879B2

(12) United States Patent
Zehetner

(10) Patent No.: US 6,799,879 B2
(45) Date of Patent: Oct. 5, 2004

(54) SYSTEM FOR FORMING AN IMAGE

(75) Inventor: Helmut Zehetner, Gerasdorf (AT)

(73) Assignee: Photonic Optische Geräte, Ges. m.b.H. & Co.KG, Vienna (AT)

( * ) Notice: Subject to any disclaimer, the term of this patent is extended or adjusted under 35 U.S.C. 154(b) by 4 days.

(21) Appl. No.: 10/309,374

(22) Filed: Dec. 3, 2002

(65) Prior Publication Data

US 2003/0124946 A1 Jul. 3, 2003

(30) Foreign Application Priority Data

Dec. 5, 2001 (AT) .......................................... 1905/2001

(51) Int. Cl.⁷ ................................................ A61B 1/06
(52) U.S. Cl. ...................... 362/558; 362/583; 362/554; 362/560; 362/551
(58) Field of Search ................................ 362/551, 554, 362/583, 560, 558

(56) References Cited

U.S. PATENT DOCUMENTS 5,341,445 A 8/1994 Davenport et al.
6,139,175 A 10/2000 Tomioka et al.
6,595,673 B1 * 7/2003 Ferrante et al. ............. 362/551

FOREIGN PATENT DOCUMENTS

| EP | 0251623 | 1/1988 |
| GB | 1114326 | 5/1968 |
| GB | 2117131 | 10/1983 |
| WO | 9521392 | 8/1995 |

* cited by examiner

*Primary Examiner*—Stephen Husar
*Assistant Examiner*—Anabel Ton
(74) *Attorney, Agent, or Firm*—Martin A. Farber

(57) ABSTRACT

An optical system forms an image of a light source, such as a short arc lamp, particularly of a high numerical aperture, via a spherical, concave reflector onto the entrance surface of a light guide. The reflector is asymmetrically arranged to the light source, and the latter has a relative large angular distance from the axis of symmetry of the reflector, so that the light guide in the path of reflected rays has also a large angular distance from this axis of symmetry and, hence, from the hot light source. In the path of rays between the light source and the spherical, concave reflector is a cylindrical lens, preferably a circular cylindrical lens, of positive diffraction.

14 Claims, 1 Drawing Sheet

FIG.
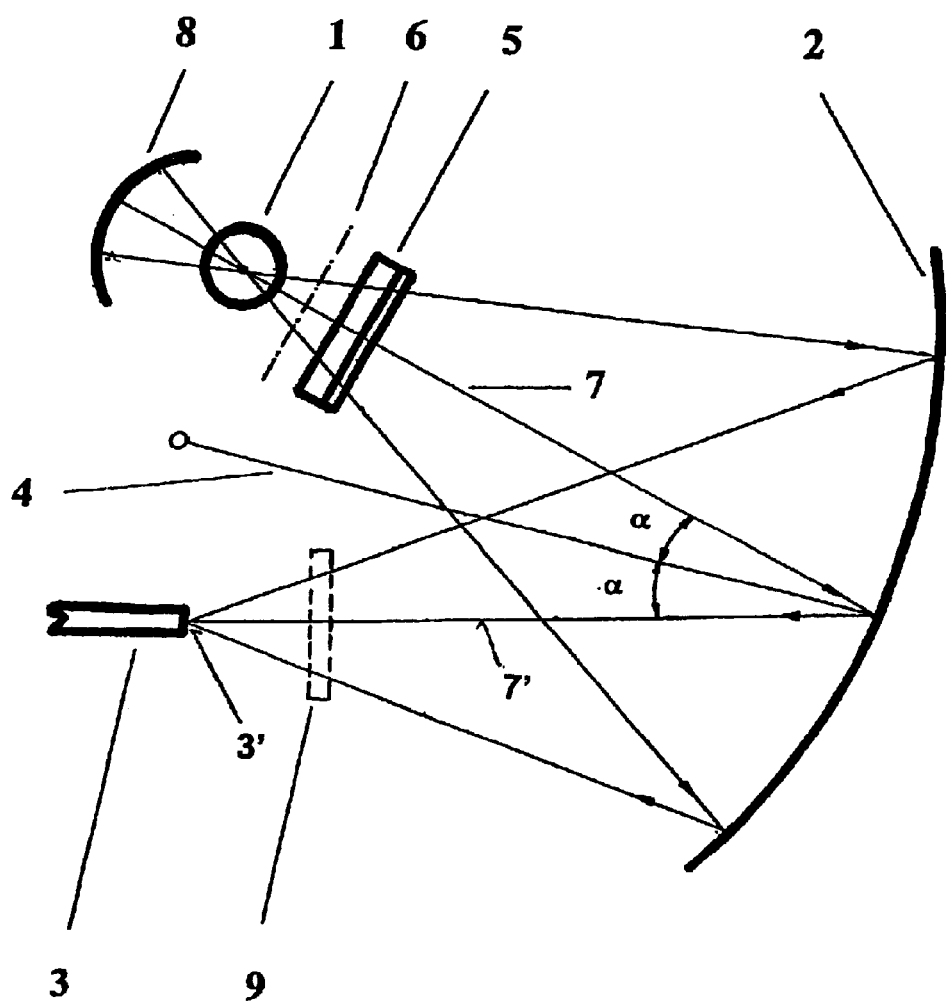

SYSTEM FOR FORMING AN IMAGE

FIELD OF THE INVENTION

The present invention relates to a system for forming an image of a small light source, such as a short arc lamp, which emits right along a first path of rays. In particular, the system has a relative high aperture which amounts preferably to at least 0.5, but can be much higher. This system uses a spherical, concave reflector receiving said light along the above-mentioned first path of rays and having a concave reflecting surface for reflecting the light received along a second path of rays, said spherical concave reflector means defining an axis of symmetry, the light source being arranged asymmetrically with respect to said axis of symmetry. If in the context of this specification a "reflector" is mentioned, it will normally be a more or less equally bent surface, although old Archimedes is told have it formed from individual partial surfaces positioned to form approximately a concave surface (which would also be possible within the scope of the invention).

BACKGROUND OF THE INVENTION

Such a system is known, for example, from GB-A-1,114,326 for forming an image onto the entrance surface of a light guide. However, due to the relative large angular distance of the light source from the axis of symmetry of the spherical, concave reflector, optical aberrations will occur in the image formed onto the entrance surface of the light guide. The astigmatism occurring with the reflection from the spherical, concave mirror reduces significantly the efficiency of the illuminating system.

To achieve an efficiency of a system for forming an image of a small light source as high as possible, such as with an electric arc lamp of 1 to 2 mm arc length onto an entrance surface of the light guide of about 1to 2 mm in diameter, it is important to ensure accordingly a magnification of about 1:1. This makes it necessary to avoid optical image distortions.

In EP-A0 251 623, an illumination system is disclosed using a spherical concave mirror and an optical correction element in the above identified second path of rays, i.e. between the spherical concave mirror and the entrance surface of the light guide, for increasing the efficiency and for reducing image distortions. This document suggests to arrange the light source as close to the axis of symmetry of the spherical concave mirror in order to keep image distortions principally small. However, this requires that the entrance surface of the light guide is equally close to the axis of symmetry. Therefore, this design has the great disadvantage that the heat emitted from the light source, due to the location of the light guide in close proximity to the light source, will destroy the light guide. Such light guides, independent of what they are made, be it an individual light fiber or a light fiber bundle, are relative expensive. When the system is used, for example, for illumination in medical endoscopes, a high reliability is a pre-condition.

SUMMARY OF THE INVENTION

It is an object of the present invention to avoid these disadvantages of the prior art. It is a further object to provide a system which is able to have the light guide in a sufficient distance from the light source so as to avoid its destruction. Another object of the invention is to provide a highly reliable system of a high efficiency, avoiding image distortions or aberrations.

These objects are achieved, according to the invention by providing at least one cylindrical lens of positive diffraction in the first path of rays, i.e. between the light source and the spherical concave reflector.

In this way, a well corrected image of the light source onto the entrance surface of the light guide will be achieved, thus rendering the efficiency very high, in spite of a high numerical aperture and even with a relative large angular distance of the light source and its first path of rays from the axis of symmetry of the reflector. Therefore, the light guide will also have a large angular distance from the axis of symmetry and, thus, from the hot light source and can no longer be affected.

Although the cylindrical lens may be aspheric, it is simpler if it is a circular cylindrical lens.

According to a preferred embodiment, the cylinder axis of the cylindrical lens is arranged perpendicularly to the first path of rays and in a meridian plane which is defined by the first path of rays and the axis of symmetry of the reflector. In this manner, any astigmatism is corrected in an optimal fashion with at low expenses and in a simple way.

According to a further characteristic of the invention, the cylindrical lens is coated with a heat protection coating, preferably a dielectric one. This is of advantage, because in this way, heat radiation of the light source emitted towards the reflector is significantly reduced.

In a further embodiment of the invention a second spherical concave reflector is provided at the side averted from the cylindrical lens to form a directional light source that defines a beam direction, the second spherical concave reflector having an axis of symmetry coincident with the above-mentioned first path of rays. In this way, the efficiency of the system is further increased by a simple and inexpensive optical component.

According to a preferred embodiment of the invention, the first and/or second reflector comprise a dielectric coating so as to form a cold light mirror in order to keep heat radiation emitted from the light source, despite the high efficiency of the system, to a high extent away from the light guide.

BRIEF DESCRIPTION OF THE DRAWINGS

Further details will become apparent from the following description of a preferred embodiment with reference to the only FIGURE which shows schematically a system for forming an image of a small light source onto the entrance surface of a light guide of a small diameter.

DETAILED DESCRIPTION OF THE DRAWING

In the drawing, an electric light source 1 is illustrated, preferably formed as a short arc lamp. Such a light source 1 can be a xenon short arc lamp which emits a light arc of about 1 to 2 mm and has a high numerical aperture of $\geq 0.5$. It is dear, however, that the present invention is not restricted to the use of an arc lamp or of a xenon arc lamp, but can likewise be applied to other light sources which may either have a smaller light emitting point (<1 mm) or a larger one, although the latter is not preferred. The electrical devices for ignition and alimentation of the light source 1 are known to those skilled in the art and are, therefore, not shown in the drawing.

The light source 1 directs a beam of rays along a first path of rays 7 to a reflector 2 which is formed as a spherical, concave mirror so as to project the light arc (or light point) of the light source 1 via a second path of rays 7' onto an entrance surface 3' of a light guide 3. The spherical, concave reflector 2 has an axis of symmetry 4. The light guide 3 may be of any kind known in the art, but is preferably formed by at least one light fiber, optionally a bundle of light fibers.

Since a lamp, and particularly an arc lamp, develops much heat and light guides may be very sensitive to heat and can be destructed by it, the light source 1 is in a large angular distance from the axis of symmetry 4 of the reflector 2. This distance is shown to from an angle α so that the reflected beam along the second path of rays 7' will also assume an angular distance of α. In this way, the light guide 3 is spaced from the light source 1 by 2α; This angle of 2α amounts preferably at least to 20°, but it is more preferred, if $2\alpha \geq 30°$.

According to this geometrical arrangement, schematically illustrated, of light source 1, spherical, concave reflector 2 and light guide 3 and its light entrance surface 3', an image of the light source 1 will be formed onto the entrance surface 3' at a scale of at least approximately 1:1. Since the light arc of the light source 1 may be very small and amount to 1 to 2 mm, and also the light guide may have an equal or unsubstantially larger diameter, the arrangement shown will provide an excellent efficiency of the illumination system.

However, the astigmatism occurring with the reflection of the light beam on the reflector's 2 surface would reduce the efficiency. In order to overcome this disadvantage and to correct this astigmatism a cylindrical lens 5 of positive diffraction is arranged within the first path of rays 7 between the light source 1 and the reflector 2. The lens 5 is preferably a circular cylindrical lens whose axis 6 is perpendicular to the main beam 7 (or first light path) of the light con emitted by the light source 1, and is in the plane of the drawing. This plane of the drawing is also defined by the axis of symmetry 4 of the reflector 2 and by the main beam 7 of the light source 1 (meridional plane).

Image distortions caused by the relative large (angular) distance of the light source from the axis of symmetry 4 are, in this way, corrected to a high extent. At the same time, the necessary small image of the light source 1 on the entrance surface 3' of the light guide 3 is achieved with high efficiency.

To further increase the efficiency, the light source 1 may comprise an additional spherical, concave reflector 8 arranged at the side of the light source 1 which is averted from the cylindrical lens 5. The axis of symmetry of this additional reflector 8 extends suitably in the direction of the main beam 7 of the light source 1. The center of curvature of the additional reflector 8 is in the focal spot or in the light arc of the light source 1. As may be seen from the drawing, the first path of rays 7 impinges onto the reflector 2 suitably at the point of origin of the symmetry axis 7.

For reducing heat transmitted and for avoiding overheating of the light guide 3 and its entrance surface 3', at least one, preferably both, reflectors 2, 8 are formed as concave mirrors having a dielectric cold light mirror coating. It is also preferred if the cylindrical lens 5 is provided with a dielectric heat protective coating formed as a hot mirror. A further possibility could be to arrange a heat shield, e.g. in form of a glass plate having a dielectric coating, along the axis of symmetry, although this is not preferred.

If necessary, a heat protective filter 9 may be inserted into the second path of rays 7' between the reflector 2 and the light guide 3 for reducing heat radiation impinging onto the entrance surface 3' of the light guide 3.

The invention is not restricted to the embodiment shown. It has already been mentioned that an individual light fiber or a bundle of fibers may be used as the light guide 3. The material of these fibers may either be glass or a plastic material (which is still more sensitive to heat). As a light source 1, electrical high-energy lamps could be used which generate a small light arc or a focal spot of 1 to 2 mm, but up to 3 mm in maximum, if one is forced to use a light guide 3 having a diameter of a similar dimension for supplying light to some location or object.

What is claimed is:

1. A system for forming an image, comprising:
   a small light source, which emits light along a first path of rays, and of which an image is to be formed;
   first spherical, concave reflector means receiving said light along said first path of rays and having a concave reflecting surface for reflecting the light received along a second path of rays, said spherical concave reflector means defining an axis of symmetry, the light source being arranged asymmetrically with respect to said axis of symmetry, said first path of rays and said axis of symmetry defining a meridian plane;
   light guide means having an entrance surface onto which said light source an image is to be formed and receiving light sent along said second path of rays; and
   lens means of positive diffraction in said first path of rays, said lens comprising a cylindrical lens having a cylinder axis, said cylinder axis being arranged perpendicularly to said first path of rays in said meridian plane.

2. System as claimed in claim 1, wherein said light source comprises an arc lamp.

3. System as claimed in claim 2, wherein said arc lamp is of a short arc lamp type.

4. System as claimed in claim 1, wherein said light guide means comprises a bundle of light fibers.

5. System as claimed in claim 1, wherein said first path of rays has an angular distance from said symmetry axis of at least 20°.

6. System as claimed in claim 5, wherein said first path or rays has an angular distance from said symmetry axis of at least 30°.

7. System as claimed in claim 1, wherein said cylindrical lens comprises a circular cylindrical lens.

8. System as claimed in claim 1, wherein said lens means is arranged so that said first path or rays coincides with the origin of said axis of symmetry on said reflecting surface.

9. System as claimed in claim 1, wherein said first spherical concave reflector means comprise a dielectric coating to form a cold-light mirror.

10. A system for forming an image, comprising:
    a small light source, which emits light along a first path of rays, and of which an image is to be formed;
    first spherical, concave reflector means receiving said light along said first path of rays and having a concave reflecting surface for reflecting the light received along a second path of rays, said spherical concave reflector means defining an axis of symmetry, the light source being arranged asymmetrically with respect to said axis of symmetry, said first path of rays ant said axis of symmetry defining a meridian plane;
    light guide means having an entrance surface onto which said light source an image is to be formed and receiving light sent along said second path of rays; and lens means of positive diffraction in said first path of rays, said lens means comprising a cylindrical lens having a cylinder axis; and
    wherein said image is formed with a high aperture of at least 0.5.

11. A system for forming an image, comprising:
    a small light source, which emits light along a first path of rays, and of which an image is to be formed;

first spherical concave reflector means receiving said light along said first path of rays and having a concave reflecting surface for reflecting the light received along a second path of rays, said spherical concave reflector means defining an axis of symmetry, the light source being arranged asymmetrically with respect to said axis of symmetry, said first path of rays and said axis of symmetry defining a meridian plane;

light guide means having an entrance surface onto which said light source an image is to be formed and receiving light sent along said second path of rays;

and lens means of positive diffraction in said first path of rays, said lens means comprising a cylindrical lens having a cylinder axis, wherein said lens means comprise at least one heat protective coating.

12. System as claimed in claim 11, wherein said at least one coating is a dielectric coating.

13. A system for forming an image, comprising:

a small light source, which emits light along a first path of rays, and of which an image is to be formed;

first spherical, concave reflector means receiving said light along said first path of rays and having a concave reflecting surface for reflecting the light received along a second path of rays, said spherical concave reflector means defining an axis of symmetry, the light source being arranged asymmetrically with respect to said axis of symmetry, said first path of rays and said axis of symmetry defining a meridian plane;

light guide means having an entrance surface onto which said light source an image is to be formed and receiving light sent along said second path of rays; and lens means of positive diffraction in said first path of rays, said lens means comprising a cylindrical lens having a cylinder axis; and wherein said light source comprises a directional light source defining a beam direction which is coincident with said first path of rays, said lens means being arranged perpendicularly to said first path of rays in a meridional plane which is defined by said axis of symmetry and said first path of rays.

14. A system for forming an image, comprising:

a small light source, which emits light along a first path of rays, and of which an image is to be formed;

first spherical, concave reflector means receiving said light along said first path of rays and having a concave reflecting surface for reflecting the light received along a second path of rays, said spherical concave reflector means defining an axis of symmetry, the light source being arranged asymmetrically with respect to said axis of symmetry, said first path of rays and said axis of symmetry defining a meridian plane;

light guide means having an entrance surface onto which said light source an image is to be formed and receiving light sent along said second path of rays; and lens means of positive diffraction in said first path of rays, said lens means comprising a cylindrical lens having a cylinder axis;

wherein said light source further comprises second spherical concave reflector means at the side averted from said lens means to form a directional light source that defines a beam direction, said second spherical concave reflector means having an axis of symmetry coincident with said first path of rays, and said second spherical concave reflector means comprise a dielectric coating to form a cold-light mirror.

* * * * *